United States Patent Office 3,355,481
Patented Nov. 28, 1967

3,355,481
CYCLOPROPANE DERIVATIVES OF 1,7-OCTADIENE
Jerome Robert Olechowski, Lake Charles, La., assignor, by mesne assignments, to Columbian Carbon Company, a corporation of Delaware
No Drawing. Filed Sept. 28, 1964, Ser. No. 399,864
4 Claims. (Cl. 260—468)

ABSTRACT OF THE DISCLOSURE

The syntheses of bis (dihalocyclopropyl) butanes (I), bis (diethoxycarbonyl-cyclopropyl) butanes (II) and diethoxycarbonyl-cyclopropyl hexene (III) are described. All are useful as insecticides and as intermediates in the production of polymers; II and III can be used as insect attractants; and III can be used as an intermediate in the production of plasticizers.

---

This invention relates to novel organic compounds and has for its object the provision of cyclopropane derivatives of 1,7-octadiene. More particularly, the invention provides cyclopropane derivatives of 1,7-octadiene that can be represented by the following formulae:

I 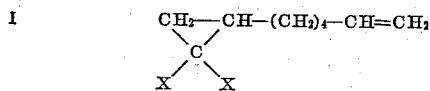

and

II 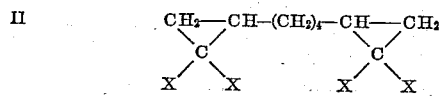

wherein X is a member of the group consisting of hydrogen, halogen and carbethoxy.

In one embodiment of the present invention, novel dihalogen substituted chloropropanes can be readily produced by the reaction of a haloform, an alkoxide ion and 1,7-octadiene, as described by Doering and Hoffmann in J. Am. Chem. Soc. 76, 6162–6164 (1954). By employing one mole of the haloform per mole of 1,7-octadiene, the halogen substituted cyclopropane represented by Formula I is obtained. The halogen substituted compound represented by Formula II is obtained by employing two moles of the haloform per mole of 1,7-octadiene. The haloforms generally preferred for use in preparing the novel compounds of the present invention are chloroform and bromoform. The reaction temperatures are generally maintained between $-10°$ C. and $10°$ C.

When 1,7-octadiene is reacted with methylene iodide and a zinc-copper couple, the cyclopropanes indicated by Formulae I and II when X is hydrogen are obtained. The 1,7-octadiene, methylene iodide, and zinc-copper couple are stirred at reflux in anhydrous ethyl ether, and the cyclopropane product is obtained by simple distillation.

In the preparation of cyclopropane derivatives containing the carboethoxy group, ethyl diazoacetate is first prepared as described in Organic Synthesis, Coll. vol. IV, pages 424–426 (1963). The diazoacetate is then decomposed in the presence of 1,7-octadiene. The cyclopropane derivative is then isolated by evaporation of the solvent, e.g. cyclohexane.

The mono adducts corresponding to Formula I are useful as novel vinyl monomers, insecticides and plant protection agents. The diadducts corresponding to Formula II may be oxidized to produce the corresponding dicarboxylic acids that are useful for the preparation of polyesters, as is obvious to one skilled in the art. Oxidation of the mono adducts will yield cyclopropyl pentanoic acids, that are useful as plasticizer intermediates. The presence of halogens in the molecule lends some flame proofing properties to the resultant esters.

The products of the present invention may be epoxidized and polymerized in accordance with conventional methods. Polymerization takes place in the presence of from about 0.01 to about 5% by weight of a free radical producing initiator. Epoxidation can be effected by use of peracids such as peracetic acid, perbenzoic acid, monoperphthalic acid, and performic acid, at temperatures ranging from about $-25°$ C. to about $150°$ C. The epoxy derivatives can be polymerized and cured by the reaction of said monomers alone or with suitable hardeners such as polycarboxylic acid compounds, polycarboxylic acid anhydrides, polyols, polyfunctional amines, and combinations thereof. Various well-known base and acid catalysts, such as acid catalysts of the Lewis acid type may be added, if desired, to accelerate the curing of the polymerization product. The amount of catalyst employed generally does not exceed about 5 weight percent, based on the weight of the epoxide. The curable polymerization compounds can be used in coatings, castings, moldings, laminates and similar useful materials.

The cyclopropyl derivatives containing the carboethoxy group may be used as an insect sex attractant. The diadducts containing carboethoxy groups are capable of trans esterification with dihydroxy compounds to produce polyesters and reaction with suitable diamines to produce unique polyamides, useful as plastic and possessing fiber-forming properties.

The following examples are set forth for purposes of illustration so that those skilled in the art may better understand this invention, and it should be understood that they are not to be construed as limiting this invention in any manner.

Example 1

Forty grams (1 mole) of potassium are reacted with 1.2 liters of t-butyl alcohol to give a solution to which 110 grams (1.0 mole) of 1,7-octadiene are added with stirring. After cooling the suspension to about $0°$ C., 90 ml. (1.1 moles) of chloroform are added with stirring in portions of 10–20 ml. each, so as to maintain the temperature of the reaction mixture below $10°$ C. After 20 ml. of chloroform has been added, the reaction mixture is diluted with about 250 ml. of n-hexane to facilitate stirring. Upon completion of the addition of chloroform, the mixture is stirred for an additional one-half hour. The mixture is then diluted with an equal volume of water. The organic phase is separated, dried and fractionated to give a product having a B.P. of 77–80° C. at 6 mm., $n_D^{25}$ 1.4736. Infra-red and chlorine analysis show the product to have the structure

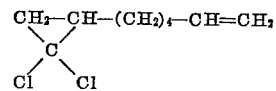

*Analysis.*—Calculated for $C_9H_{14}Cl_2$: Cl, 36.5. Found: Cl, 37.2.

Example 2

The procedure of Example 1 is repeated employing 2.2 moles of chloroform per mole of 1,7-octadiene. A product is obtained that infra-red and chlorine analysis show to have the structure

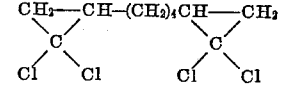

Example 3

Twenty grams (0.18 mole) of 1,7-octadiene, 40.2 grams (0.15 mole) of methylene iodide and zinc-copper couple (14.4 grams, 0.22 mole of zinc) are stirred at reflux (35°

C.) in anhydrous ethyl ether for approximately 48 hours. The reaction mixture is then distilled to separate a hydrocarbon product identified by infra-red spectrum as

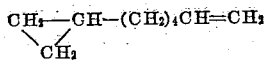

Example 4

The process of Example 3 is repeated employing a mole ratio of methylene iodide to 1,7-octadiene of approximately 2.3:1. The hydrocarbon product is found by infra-red analysis to have the structure

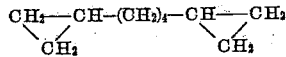

Example 5

A solution of 140 grams (1 mole) of ethyl glycinate hydrochloride in 250 milliliters of water is mixed with 600 milliliters of methylene chloride and cooled to −5° C. After flushing the flask with hydrogen, an ice-cold solution of 83 grams (1.2 moles) of sodium nitrite in 250 milliliters of water is added with stirring. The temperature is lowered to −9° C., and 95 grams of 5% (by weight) sulfuric acid is added during a period of about three minutes. A cooling bath is maintained at −23° C. in order to maintain the reaction mixture at less than +1° C. The reaction mixture is transferred to an ice-cold 2–1 separatory funnel, and the yellow-green methylene chloride layer is run into 1 liter of cold 5% sodium bicarbonate solution. The aqueous layer is extracted once with 75 ml. of methylene chloride. The methylene chloride and sodium bicarbonate solutions are returned to the separatory funnel and shaken until no trace of acid remains. The golden yellow organic layer is separated, transferred to a dry separatory funnel, and shaken for 5 minutes with 15 grams of granular anhydrous sodium sulfate. The dried ethyl diazoacetate solution is filtered through a cotton plug inserted in the separator funnel stem, and the bulk of the solvent is distilled through an efficient column at a pressure of about 350 mm. The last traces of solvent are removed at a pressure of 20 mm. and a maximum temperature of 35° C.

100 grams (0.88 mole) of the resultant ethyl diazoacetate product are decomposed with sulfuric acid in the presence of 90 grams (0.82 mole) of 1,7-octadiene. The product obtained by evaporation of the cyclohexane solvent is found to have the structure

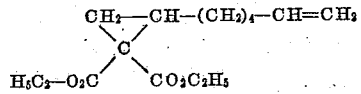

Example 6

The process of Example 5 is repeated employing 210 grams (1.85 moles) of ethyl diazoacetate. Analysis of the resulting product shows it to have the structure

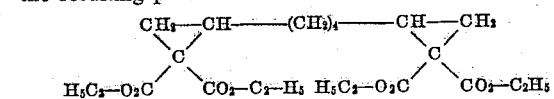

What is claimed is:
1. Cyclopropane derivatives of 1,7-octadiene selected from the group consisting of

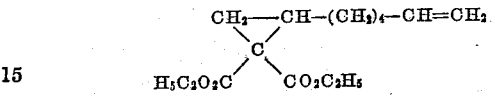

and

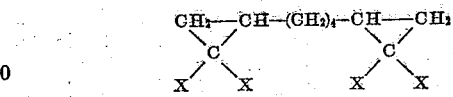

wherein X is a member of the group consisting of a halogen and carboethoxy.

2. As a new compound, bis(1,1-dichloro-2-ethyl-cyclopropane) having the formula

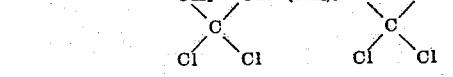

3. As a new compound, 1,1-dicarboethoxy-2-(5-hexenyl) cyclopropane having the formula

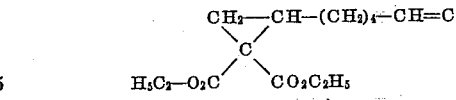

4. As a new compound, bis(1,1-dicarboethoxy-2-ethylcyclopropane) having the formula

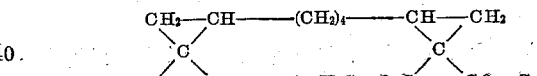

References Cited
UNITED STATES PATENTS
3,074,984   1/1963   Simmons _____ 260—468

OTHER REFERENCES

Skattebol, "J. Org. Chem.," vol. 29, 1964, pp. 2951–2956.

Wagner et al., "Rec. Trav. Chim.," vol. 80, 1961, pp. 740–746.

LORRAINE A. WEINBERGER, *Primary Examiner.*

RICHARD K. JACKSON, *Examiner.*